Aug. 28, 1945.　　　I. ELLIOTT　　　2,383,536
DOUGH DIVIDING MACHINE
Filed July 26, 1944　　　2 Sheets-Sheet 1

INVENTOR.
Irwin Elliott
BY

Patented Aug. 28, 1945

2,383,536

UNITED STATES PATENT OFFICE 2,383,536

DOUGH DIVIDING MACHINE

Irwin Elliott, Croton on Hudson, N. Y., assignor to Krum-Elliott Company, New York, N. Y., a copartnership composed of Irwin Elliott and Carl E. Krum Application July 26, 1944, Serial No. 546,639½

2 Claims. (Cl. 107—15)

This invention relates to a novel and improved form of divider for dough, cake batter, fruit fillings and like substances, the principal object of the invention being to provide a machine which will efficiently operate with matters of widely different consistency such as roll dough, biscuit dough, cake batter and fruit fillings.

Another important object of the invention is to provide a machine which will act upon the dough or batter with less working or compression than is obtainable in prior kindred apparatus.

Yet another object of the invention is to provide a dividing and depositing mechanism which will operate with fruit fillings for pies without objectionable crushing of whole fruit such as cherries and strawberries or of fruit pieces such as apple slices.

The novel features of the invention will be best understood from the following description and annexed drawings in which:

Figs. 1, 2, 3, and 4, Sheet 1 are vertical sections showing the working parts in the different positions which they take during the operation.

Figure 5:
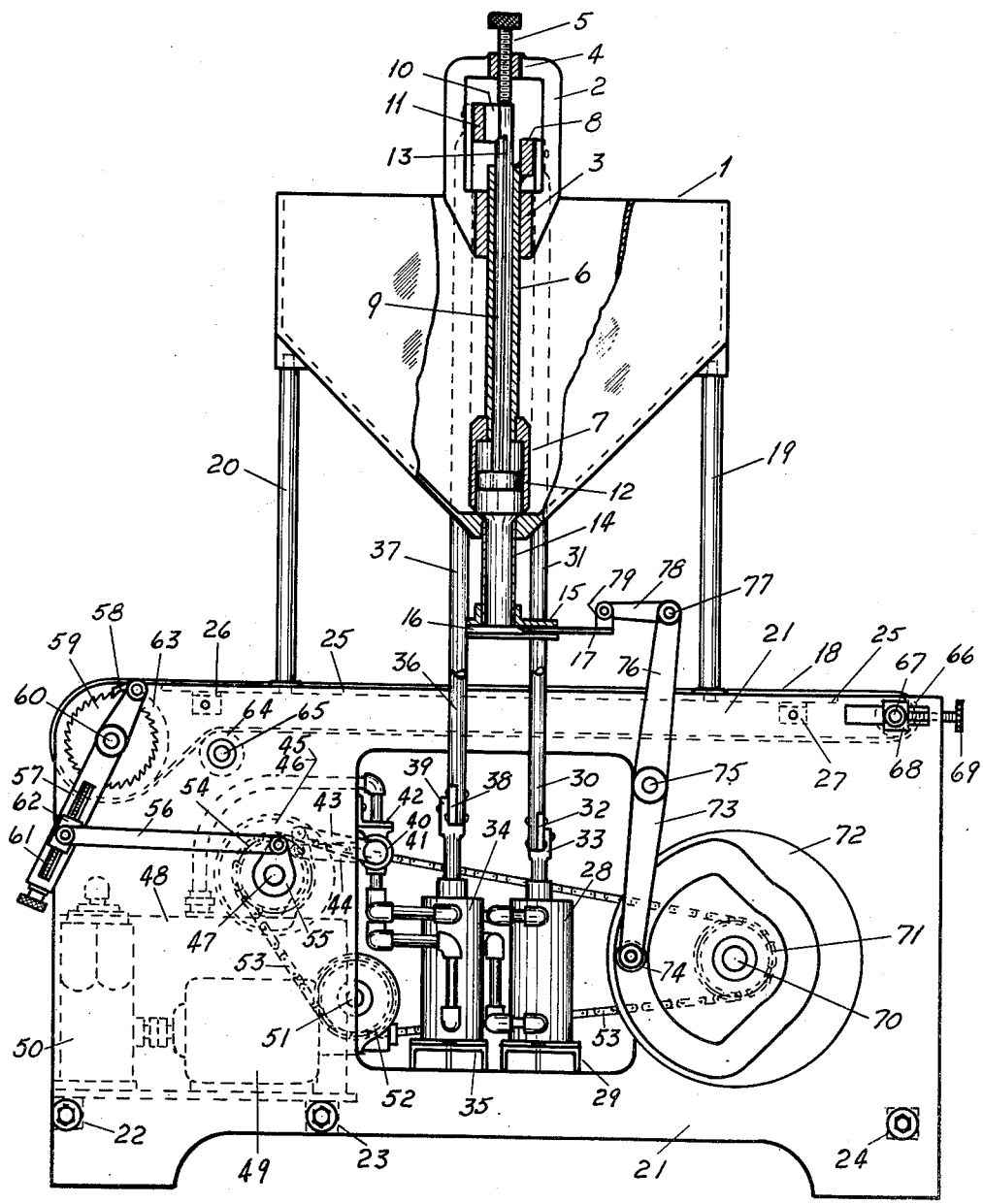

Fig. 5, Sheet 2, is a side elevation, partly sectional of a complete machine.

Referring first to Figs. 1, 2, 3 and 4 I have shown therein a hopper or reservoir 1 for containing the matter to be divided which I shall hereinafter, for the sake of simplicity, refer to as dough.

Bracket 2 which extends across and is secured to opposite sides of the hopper 1 is provided with a slide bearing 3 at the bottom and a threaded boss 4 at the top. Adjustment screw 5 operates in the threaded boss 4.

A tubular plunger 6 reciprocates in bearing 3. A chamber 7 is fastened to the lower end of plunger 6. The function of this chamber is to segregate from the mass of dough in the hopper that portion which is to be divided from the mass. I will therefore refer to this part as the measuring chamber.

A cross bar 8 is welded to plunger 6, the function of this cross bar is to impart to the plunger a reciprocating motion.

A connecting rod 9 slides inside of plunger 6 and is provided with boss 10 at the top, which boss is welded to cross bar 11. Cross bar 11 imparts to connecting rod 9 a reciprocating motion.

A piston 12 is fastened to the end of connecting rod 9, this piston is made a close sliding fit in measuring chamber 7. The connecting rod 9 is provided with groove 13 to permit the entrance and escape of air to and from the measuring chamber above the piston.

A discharge tube 14 extends through the bottom of the hopper. The lower end of this tube is equipped with fitting 15 which is provided with groove 16 to accommodate cut-off knife 17.

The part designated 18 represents a belt for receiving the dough which is ejected from the discharge tube.

Figure 1:
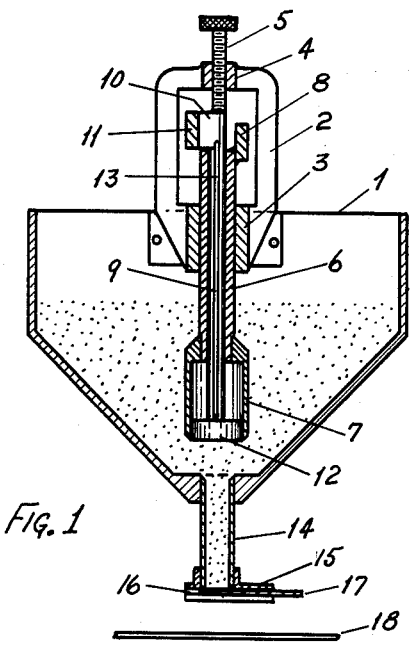

In operation it will be observed from Fig. 1 that when the measuring chamber 7 and the piston 12 are in their upward position the bottom of the piston is flush with the bottom of the measuring chamber and the top of tube 6 is in contact with the extended boss 10 on connecting rod 9. The adjustment screw 5 therefore controls the amount of upward travel of both the piston and the measuring chamber.

Figure 2:
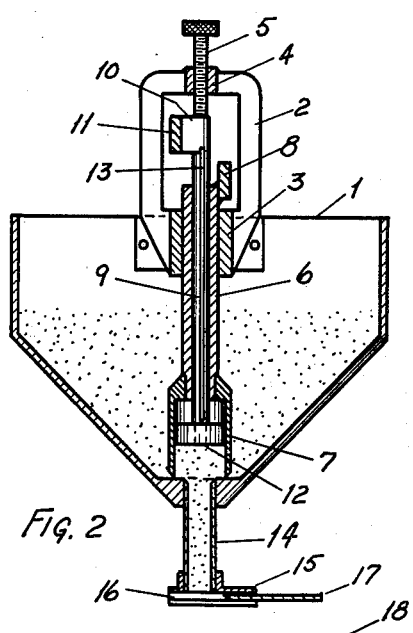

From the position shown in Fig. 1 the measuring chamber moves downward through the dough until in contact with the bottom of the hopper as shown in Fig. 2, thus enclosing and segregating the dough now contained in the measuring chamber.

Figure 3:
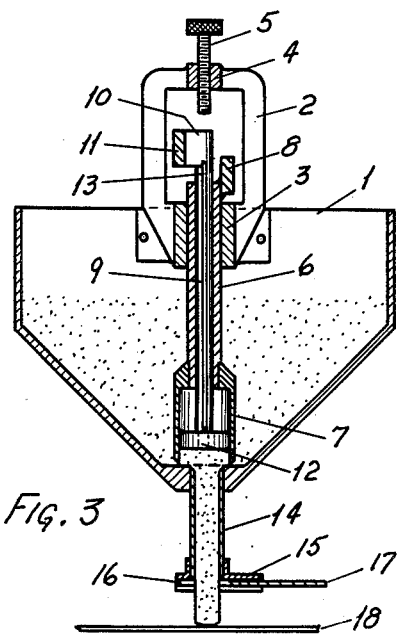

The cut-off knife 17 now opens and the piston 12 starts downward as shown in Fig. 3 forcing the segregated dough through the discharge tube 14.

Figure 4:
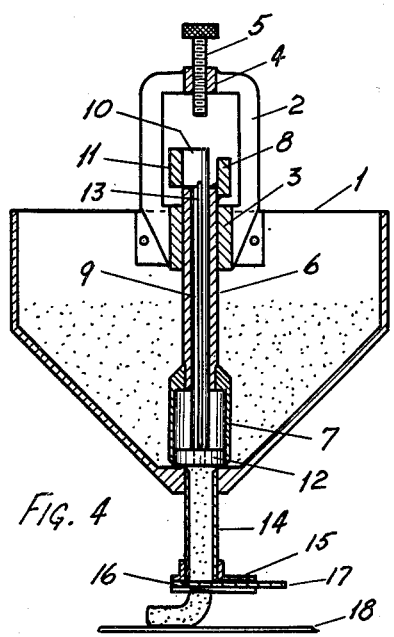

The completed downward stroke is shown in Fig. 4; the piston having completed its travel and the cut-off knife closed, cutting off the ejected dough.

From the position shown in Fig. 4 the measuring chamber and piston move upward simultaneously to the position shown in Fig. 1, the amount of this movement and thus the quantity of dough to be segregated being controlled by the adjustment screw 5.

It will be apparent that the action on the divided dough has been reduced to a minimum with this mechanism. There is no working or mixing action and the compression is only that required to overcome the friction caused by the movement of the dough through the discharge tube. This is an important feature and one of the main objects of the invention.

Referring now to Fig. 5 it will be seen that the parts similar to those in Figs. 1, 2, 3 and 4 are designated by similar numerals.

Fig. 5 shows a means of accomplishing the mechanical movements described above and shown in Figs. 1, 2, 3, and 4.

The reciprocating motion of the measuring chamber 7 and piston 12 is produced by means of double acting compressed air cylinders which are timed by cam operated valves. The movements of the cut-off knife are produced by means of a cam and the motion of the conveyor belt by a ratchet wheel and pawl made variable by means of a slotted lever.

It will be seen that the hopper 1 is supported on standards 19, 19 and 20, 20, one on each corner of the hopper, the standards are fixed to and supported by side frames 21, 21 which are spaced apart by stretches 22, 23, and 24 at the bottom and cross plate 25 at the top, which plate also serves as a support for the conveyor belt 18. Angle brackets 26, 26 and 27, 27 fasten the cross plate 25 to the side frames 21, 21.

Air cylinder 28, supported on cross channel 29 imparts a reciprocating motion to measuring chamber 7 through connecting rods 30 and 31 arranged at each side of the machine. At the bottom these connecting rods are fixed to cross bar 32 which is fastened to the yoke 33 of the cylinder piston rod. At the top the connecting rods 30 and 31 are fastened to cross bar 8.

Air cylinder 34 supported on cross channel 35 imparts a reciprocating motion to connecting rod 9 and piston 12 in the same manner through connecting rods 36 and 37 which are fastened at the bottom to cross bar 38 and at the top to cross bar 11. The cross bar 38 is fixed to yoke 39 of the piston rod of cylinder 34.

Valves 40 and 41, mounted in line on angle 42 are operated by cam levers 43 and 44 which are actuated by cams 45 and 46 mounted on shaft 47.

A conventional arrangement of piping connects between the valves 40 and 41 and the cylinders 28 and 34, also between valves 40 and 41 and the compressed air storage tank 48.

A double end motor 49 is coupled at one end to air compressor 50 and the other end is equipped with a worm and worm wheel speed reducing unit.

On the shaft 51 of the reducing unit a drive sprocket 52 is fastened. This drive sprocket, by means of chain 53 and sprocket 54 revolves shaft 47.

Crank 55 is fixed to the end of shaft 47, which crank, through connecting rod 56 operates lever 57. Pawl 58 which engages the teeth of ratchet wheel 59 is mounted on lever 57. The lever 57 is bored a free fit in order to rock on shaft 60 which serves as the fulcrum. Adjustment screw 61, engaging in the threaded slide block 62 controls the angle through which lever 57 moves and thus the amount of movement of conveyor belt 18 which is driven by pulley 63 fastened to shaft 60.

Idler pulley 64 is mounted on shaft 65. This pulley serves to raise the belt 18 in order to clear the piping and mechanism and also to give a greater wrap of the belt around drive pulley 63.

The belt 18 is extended at the other end by take-up pulley 66 mounted on shaft 67 which is journalled in bearing blocks 68. An adjustment screw 69 at each side of the machine controls the tension of the belt by the movement of the bearing blocks.

A cross shaft 70 is driven by chain 53 and sprocket 71. Cam 72 is mounted on the end of shaft 70 and this cam controls the movements of the cut-off knife 17. The cam lever 73 which is equipped with roller 74 is fixed to rocker shaft 75. Levers 76, 76 one at each side of the machine are connected across at the top by pin 77, connecting rod 78 connects from the pin 77 to bracket 79 which is mounted on the cut-off knife 17.

While I have shown the invention as embodied in a specific form, it is understood that various changes in details may be made without departing from the scope of the invention as defined in the appended claims.

I claim:

1. A dough dividing machine comprising a reservoir for the dough, a measuring chamber immersed in the dough and having an open end, said chamber being mounted with freedom to be advanced into engagement with and to be withdrawn from a wall of the reservoir, a discharge opening in said wall of the reservoir located to communicate with the interior of the chamber when the latter is in engagement with said wall, a piston movable within the chamber from an inner position remote from the open end thereof to an outer dough-discharging position in which its outer surface is substantially flush with such open end of the chamber, and means adapted to simultaneously withdraw both the chamber and the piston while maintaining the outer surface of the piston substantially flush with the open end of the chamber.

2. A dough dividing machine comprising a reservoir for the dough, a measuring chamber immersed in the dough and having an open end, said chamber being mounted with freedom to be advanced into engagement with and to be withdrawn from a wall of the reservoir, a discharge opening in said wall of the reservoir located to communicate with the interior of the chamber when the latter is in engagement with said wall, a piston movable within the chamber from an inner position remote from the open end thereof to an outer dough-discharging position, means for moving the chamber to withdraw the same a predetermined distance from its wall-engaging position, and means for simultaneously withdrawing the piston a fixed and substantially equal distance.

IRWIN ELLIOTT.